United States Patent
Yarvis et al.

(10) Patent No.: US 7,930,379 B2
(45) Date of Patent: Apr. 19, 2011

(54) INTERFACE FOR A DELAY-TOLERANT NETWORK

(75) Inventors: Mark D Yarvis, Portland, OR (US);
Rahul Shah, San Francisco, CA (US);
Chieh-Yih Wan, Hillsboro, OR (US);
Yong Wang, Princeton, NJ (US)

(73) Assignee: Intel Corporation, Santa Clara, CA (US)

( * ) Notice: Subject to any disclaimer, the term of this patent is extended or adjusted under 35 U.S.C. 154(b) by 1054 days.

(21) Appl. No.: 11/694,461

(22) Filed: Mar. 30, 2007

(65) Prior Publication Data
US 2008/0244089 A1   Oct. 2, 2008

(51) Int. Cl.
*G06F 15/173* (2006.01)
*G06F 15/16* (2006.01)

(52) U.S. Cl. .............. 709/223; 709/231; 707/999.2; 707/999.203

(58) Field of Classification Search .......... None
See application file for complete search history.

(56) References Cited

U.S. PATENT DOCUMENTS

| | | | | |
|---|---|---|---|---|
| 7,631,021 | B2 * | 12/2009 | Sarma et al. ............. | 1/1 |
| 2005/0246389 | A1 * | 11/2005 | Shah et al. .............. | 707/200 |
| 2006/0075064 | A1 * | 4/2006 | Keohane et al. ............ | 709/217 |

OTHER PUBLICATIONS

Demmer, "TierStore and DTN; Distributed Storage in Cambodia", retrieved from http://www.cs.berkeley.edu/~demmer/talks/tierstore-tier-workshop-oct05.ppt; 19 pgs.
Demmer, "The DTN Reference Implementation", IETF DTNRG Meeting Mar. 9, 2005; retrieved from http://www.cs.berkeley.edu/~demmer/talks/dtn-impl-ietf-3-5-05.ppthttp://www.cs.berkeley.edu/~demmer/talks/dtn-impl-ietf-3-5-05.ppt; 26 pages.
Demmer, et al. "Tierstore" retrieved from http://www.cs.berkeley.edu/~demmer/talks/tierstore-ict4b-aug04.ppt; 10 pages.
Demmer, et al. "TierStore: A Distributed Filesystem for Challenged Networks in Developing Regions", retrieved from http://www.cs.berkeley.edu/~bowei/papers/tierstore.pdf; 15 pages.
"TierStore" webpage last modified Apr. 19, 2008 and retrieved from http://tier.cs.berkeley.edu/wiki/TierStore; 2 pages.

* cited by examiner

*Primary Examiner* — Wen-Tai Lin
(74) *Attorney, Agent, or Firm* — Grossman, Tucker, Perreault & Pfleger, PLLC

(57) ABSTRACT

The present disclosure provides a method for delay tolerant networking. According to one exemplary embodiment, the method may include transmitting a file from a first node associated with a first network to at least one intermediate node via a file-system interface. The method may also include receiving the file at the at least one intermediate node via the file system interface. The method may further include transmitting the file from the at least one intermediate node to at least one node of an additional network via the file-system interface and receiving the file at the at least one node of the additional network via the file-system interface. Of course, additional embodiments, variations and modifications are possible without departing from this embodiment.

11 Claims, 4 Drawing Sheets

700

Transmitting a file from a first node associated with a first network to at least one intermediate node via a file-system interface
702

Receiving the file at the at least one intermediate node via the file system interface
704

Transmitting the file from the at least one intermediate node to at least one node of an additional network via the file-system interface
706

Receiving the file at the at least one node of the additional network via the file-system interface
708

FIG. 7

INTERFACE FOR A DELAY-TOLERANT NETWORK

FIELD

The present disclosure describes an interface for delay-tolerant networking.

BACKGROUND

Delay-tolerant networking has been proposed for a variety of applications such as spanning the solar system in an interplanetary Internet, periodic delivery of news and financial information to rural communities via a network of bus-based or intermittently connected relays, or periodic exchanges of new music and exercise performance to and from a runner's MP3 player each day. Like a traditional Internet, a delay-tolerant network transmits packetized data over multiple hops. Unlike a traditional Internet, in a delay-tolerant network the entire path of a transmission does not have to be active at a given moment for transmission to occur. Rather than relying on the ability to rapidly transmit packets back and forth across a data path, a delay tolerant network opportunistically moves an entire semantic chunk of data (e.g., a file) one hop at a time, as links become available, in a store-and-forward manner.

BRIEF DESCRIPTION OF DRAWINGS

Features and advantages of the claimed subject matter will be apparent from the following detailed description of embodiments consistent therewith, which description should be considered with reference to the accompanying drawings, wherein:

FIG. 7 is a flowchart of exemplary operations consistent with the present disclosure.

Although the following Detailed Description will proceed with reference being made to illustrative embodiments, many alternatives, modifications, and variations thereof will be apparent to those skilled in the art.

DETAILED DESCRIPTION

A delay tolerant network (DTN) may provide an overlay on top of a regional network, such as the Internet. In this way, DTNs may support an interoperability of regional networks by accommodating long delays between and within regional networks, and by translating between regional network communication characteristics. Thus, DTNs may accommodate the mobility and limited power of evolving wireless communication devices.

Generally, this disclosure provides a file-system based interface for configuring and using a delay-tolerant network. This interface may allow the user to both describe the topology of the delay-tolerant network, as well as to interact with the network by sending and receiving files. This disclosure may also provide an independent architecture having multiple transport layer operators that enable delay-tolerant overlay networking. These elements may allow a user to dynamically change its topology in order to interact with a delay-tolerant overlay network, thus allowing for the sending and receiving of data.

Figure 1:
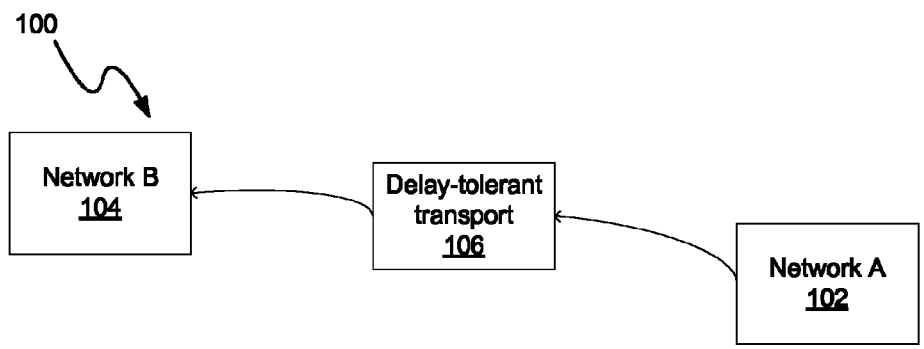
FIG. 1 is block diagram of a delay tolerant network in accordance with one exemplary embodiment of the present disclosure.

Referring now to FIG. 1, an exemplary embodiment of a delay tolerant network having a file-system based interface is shown. FIG. 1 depicts an overlay network between Network A 102, Network B 104 and delay-tolerant transport 106. An overlay network, as used herein, may refer to a computer network built on top of an existing network. In this embodiment, data from Network A 102 may be sent to Network B 104 via delay-tolerant transport 106. A personal computer or other device associated with Network A 102 may transmit a file to a personal computer onboard delay-tolerant transport 106. When delay-tolerant transport 106 comes within range/connectivity of Network B 104 the file may be transmitted to a server associated with Network B 104. The connection between each of the networks and delay-tolerant transport 106 may both be periodically available, but rarely, if ever, at the same time, due to the great distance between the networks or other physical limitations of the communication technology (e.g., metal objects, etc.). The file may be transmitted one overlay hop at a time until the final destination has been reached. As expected the embodiment shown in FIG. 1 may be expanded to include multiple mobile transports and additional networks. In this embodiment, both the configuration and use of the delay-tolerant overlay network may occur via files in the file system as is discussed in greater detail below.

The term "node" as described herein may refer to an entity with a bundle layer. A node may be a host, router, or gateway (or some combination) acting as a source, destination or forwarder of bundles. A host may send and/or receive bundles, but may not forward them. A host may be a source or destination of a bundle transfer. A router may forward bundles within a single DTN region and may optionally be a host. A gateway may forward bundles between two or more DTN regions and may optionally be a host. Some or all of these devices may require persistent storage in order to meet the time requirements necessary for DTN.

Figure 2:
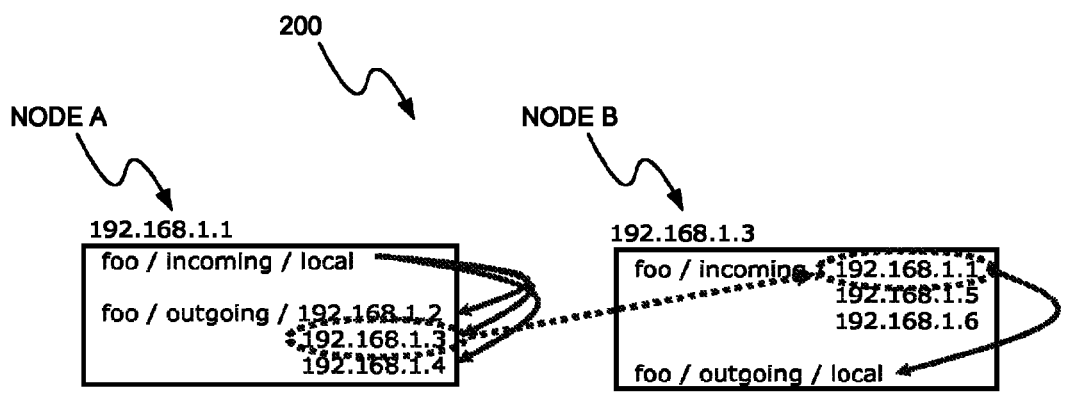
FIG. 2 is a diagram showing another exemplary embodiment depicting the data flow for a directory structure in accordance with the present disclosure.

Referring now to FIG. 2, an exemplary embodiment of a network file system showing data flow for a directory structure 200 is shown. The network file system may be configured to support the sharing of files using persistent storage over an overlay network. The individual file paths associated with the file system interface of the present disclosure may include one of the following forms: <topology>/incoming/<address>/<filename> or <topology>/outgoing/<address>/<filename>. Here, <topology> may represent the name of a particular overlay topology on which data files may flow. The literals "incoming" and "outgoing" may represent directories into which files may be delivered from other machines and from which files are delivered to other machines respectively. <address> may represent either a network address, machine name, or the literal "local" representing the local machine. <filename> may represent the name of a file being transported by the system. All files within the incoming subdirectory structure (e.g., put there by the user or by the delay-tolerant service) may have an associated lock file. This lock file may be present if and only if the contents of the associated file are complete.

Data flow in this system may be dictated using the directory structure. This may be further illustrated by describing how data may flow from one node to another. For example, a user may offer a file for delivery via the delay-tolerant service by placing it in the incoming/local directory of one of the topologies and creating the associated lock file. In FIG. 2, for example, the user might place a new file in foo/incoming/local of node A (i.e., 192.168.1.1). The service may copy (or link) files in all incoming subdirectories to all subdirectories in the outgoing directory, for delivery to each of the hosts specified by those subdirectories. In FIG. 2, these subdirectories suggest delivery to the hosts with addresses 192.168.1.2, 192.168.1.3 and 192.168.1.4. When IP connectivity is established between nodes A (i.e., 192.168.1.1) and B (i.e., 192.168.1.3), the file may be copied from the outgoing directory associated with the next hop to the incoming directory on the target node associated with the previous hop. In this example, the next hop refers to Node B and the previous hop refers to Node A. The associated lock file may also be created in the target directory, and the file may be deleted from the source directory, once copying is successfully completed. For example, in FIG. 2 the file may move from foo/outgoing/192.168.1.3 on node 192.168.1.1 to foo/incoming/192.168.1.1 on node 192.168.1.3. As expected, the service may copy and/or link files in all incoming subdirectories to all outgoing subdirectories. In the example of FIG. 2, a file delivered to foo/incoming/192.168.1.1 of node 192.168.1.3 would appear in foo/outgoing/local of that same node.

The directory structures within the incoming and outgoing subdirectories may control the movement of data between nodes, and hence the topology of data delivery. In some embodiments, this topology may be unidirectional and may form a directional graph with no loops. Once a file is delivered to the delay tolerant service (e.g., placing the file in the incoming/local directory), it may eventually be transmitted to every machine listed in the topology (i.e., in the outgoing structure). Since the topology may define the destinations to which data will be delivered, a different topology may be required for each desired set of destination nodes.

In some embodiments, the directory <topology>/incoming/local may be used to introduce new files to the system from the local node. Local software components may place files here for delivery. The directory <topology>/outgoing/local may be used to deliver files to the local node where local software components may be used to access the file.

Figure 3:
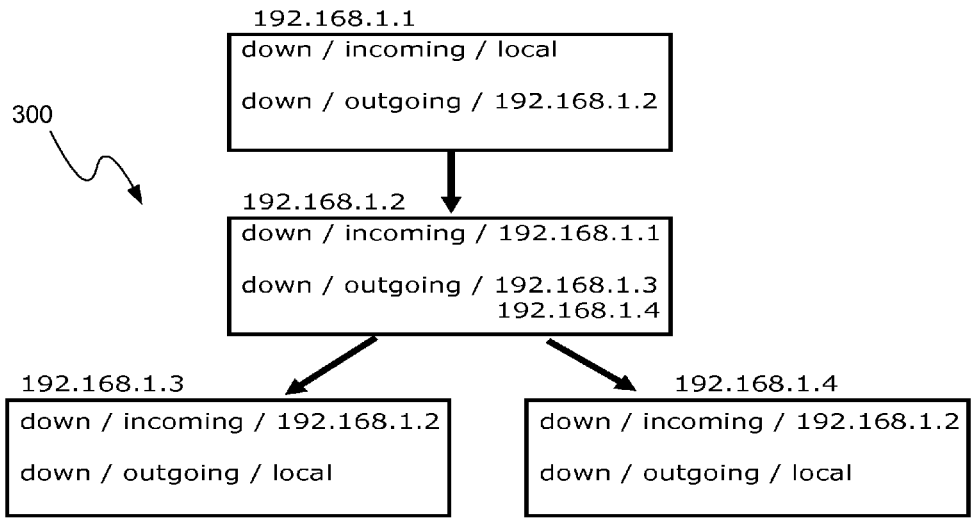
FIG. 3 is a diagram showing another exemplary embodiment depicting the data flow for a directory structure enabling a multihop communication tree in accordance with the present disclosure.

Referring now to FIG. 3, an exemplary embodiment showing one directory structure interface 300 is shown. The directory structure interface 300 may be used to configure multi-hop communication, forming an overlay network consisting of arbitrary trees and loop-free graphs. For example, files input at node 192.168.1.1 may transit to nodes 192.168.1.3 and 192.168.1.4 through node 192.168.1.2. At node 192.168.1.2, files are expected to be received from 192.168.1.1 and sent to 192.168.1.3 and 192.168.1.4. Since each node may provide a store-and-forward service, data may be delivered without the end-to-end path ever being connected. If a directory down/outgoing/local existed on node 192.168.1.2, data may also be delivered at that node.

Figure 4:
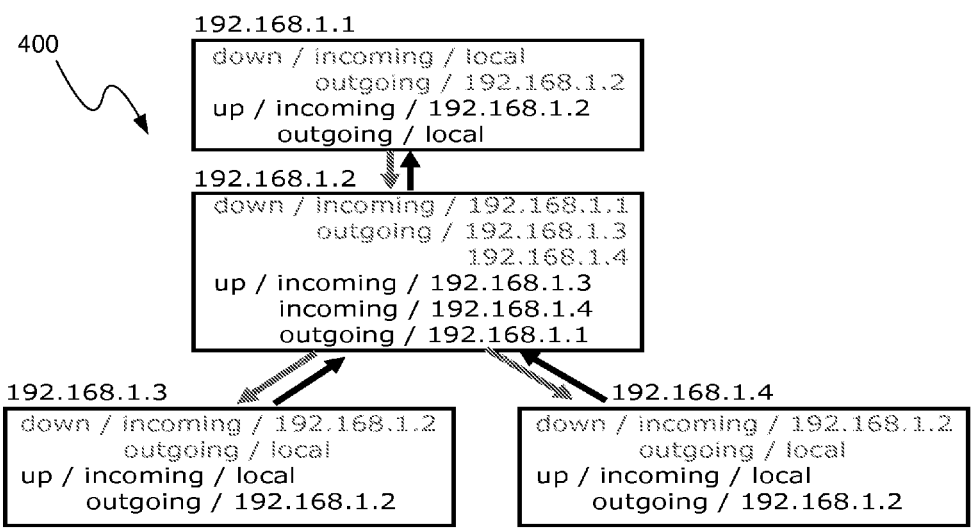
FIG. 4 is a diagram showing another exemplary embodiment depicting a bi-directional overlay network in accordance with the present disclosure.
Figure 5:
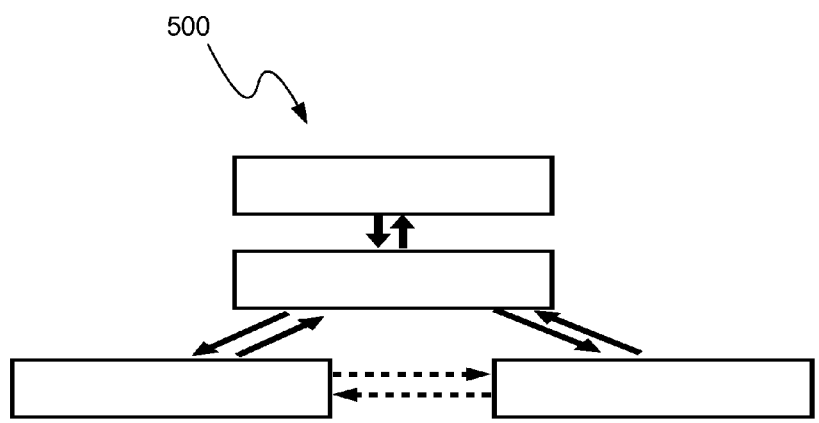
FIG. 5 is a diagram showing another exemplary embodiment depicting possible data flow in a bi-directional overlay network in accordance with the present disclosure.

Referring now to FIGS. 4 and 5, embodiments of the present disclosure showing multiple topologies and configurations are shown. Multiple topologies may be used to create a bi-directional tree, as well as more complicated graph structures. In these embodiments, each topology may operate independently, having its own inputs and outputs. For example, FIG. 4 shows a bi-directional overlay network 400 and FIG. 5 shows a bi-directional tree 500 having horizontal communication between the leaves. Some structures that may be created by combining multiple topologies may include but are not limited to, ring, mesh, star, partially connected, fully connected, line, tree and bus topologies.

Figure 6:
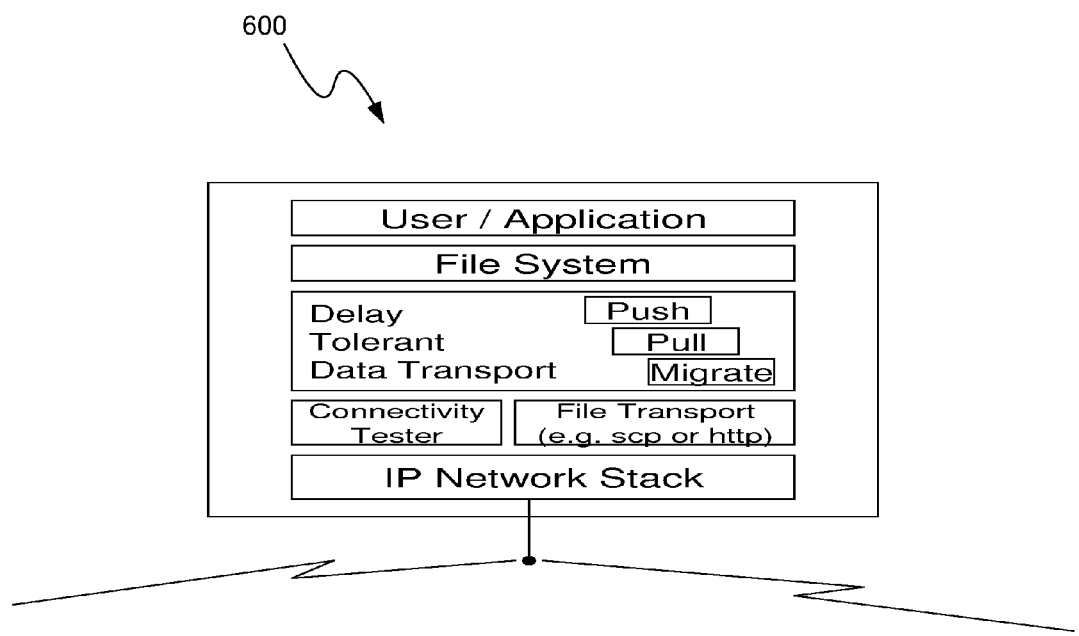
FIG. 6 is a diagram showing yet another exemplary embodiment depicting the software architecture used to implement delay tolerant delivery on a node.

Referring now to FIG. 6, a node architecture 600 for implementing the delay-tolerant transport described above is shown. In this embodiment, the file system may provide the interface from the user application to the delay-tolerant transport service. Operations (described in further detail below) may provide the core activities of the transport. An IP networking stack may allow communication between nodes in the overlay topology created by the delay-tolerant transport. Of course additional network stacks, such as, ad hoc networking protocols, could also be used. Multiple components may be included between the delay-tolerant transport and the IP networking stack. For example, a connectivity tester, which may determine whether adjacent nodes in the overlay topology may be reached at a given moment may be included. In some embodiments, a file transport such as secure copy (scp) or hypertext transfer protocol (http) may also be included.

At least one operation module may be used to control the actions of the delay-tolerant transport (e.g., migrate, push, and pull as shown in FIG. 6). Each operation may operate on a single topology at scheduled intervals. In some embodiments, multiple instances of a given operation may be required when multiple topologies are present. Each node may execute the migrate function for each topology, however, various combinations of push and pull are envisioned. For example, we may choose that node A push files to node B, or we may choose to have node B pull files from node A.

The "migrate" operations may copy all of the files found in the incoming subdirectory structure for a given topology to each subdirectory of the outgoing tree for that topology. This may cause a copy of each incoming file to be distributed to each next hop. Exemplary pseudocode for the "migrate" operations are provided below.

```
For each address in <root>/<topology>/incoming/
    For each file in <root>/<topology>/incoming/address/
        If <root>/<topology>/incoming/address/file.done doesn't exist
            skip to next file
        For each directory in <root>/<topology>/outgoing/
            Create a link to <root>/<topology>/incoming/address/file in
                <root>/<topology>/outgoing/directory (or make a copy)
        remove <root>/<topology>/incoming/address/file
        remove <root>/<topology>/incoming/address/file.done
```

The lock file in the incoming directory may be managed. Note that in the given pseudocode, the copy function is implemented assuming a linking function in the underlying file system (e.g. "hard links" in Unix-based file systems). In some embodiments, a file copy or similar mechanism may also be implemented.

The "push" operation may review all subdirectories in the outgoing directory and attempt to establish connectivity with each associated target machine. If connectivity is established, all files may be copied to the incoming directory corresponding to the local machine on the remote machine. This operation may also require careful management of the lock files on the remote machine. Exemplary pseudocode for the "push" operations are provided below:

```
For each address in <root>/<topology>/outgoing/
    If address is reachable
        For each file in < root>/<topology>/outgoing/address/
            copy <root>/<topology>/outgoing/address/file to
            <root>/<topology>/incoming/<my-address> on node
            address
            if copy failed, skip to next address
            create file <root>/<topology>/incoming/<my-
            address>/file.done on node address
            Remove file
```

The "pull" operations may review all subdirectories in the incoming directory and attempt to establish connectivity with each associated source machine. If connectivity is established, a file list may be obtained from the outgoing directory on the remote machine that corresponds to the local machine. Each file may be copied in turn, with care taken to manage the lock files in the incoming directory. Exemplary pseudocode for the "pull" operations are provided below:

```
For each address in <root>/<topology>/incoming/
    If address is reachable
        Fetch file-list from directory <root>/<topology>/outgoing/<my-
        address> on node address
        For each file in file-list
            copy <root>/<topology>/outgoing/<my-address>/file from
            node address to local directory <root>/<topology>/
            incoming/address
            If copy was successful
                Create <root>/<topology>/incoming/address/file.done
                Remove <root>/<topology>/outgoing/<my-
                address>/file from node address
```

FIG. 7 depicts another flowchart 700 of exemplary operations consistent with the present disclosure. Operations may include transmitting a file from a first node associated with a first network to at least one intermediate node via a file-system interface (702). Operations may also include receiving the file at the at least one intermediate node via the file system interface (704). Operations may further include transmitting the file from the at least one intermediate node to at least one node of an additional network via the file-system interface (706). Operations may additionally include receiving the file at the at least one node of the additional network via the file-system interface (708). Of course, additional operations are also within the scope of the present disclosure. It should be understood at the outset that any of the operations and/or operative components described in any embodiment herein may be implemented in software, firmware, hardwired circuitry and/or any combination thereof.

Embodiments of the methods described above may be implemented in a computer program that may be stored on a storage medium having instructions to program a system to perform the methods. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic operations. Other embodiments may be implemented as software modules executed by a programmable control device.

Accordingly, at least one embodiment described herein may provide a system including a file-system interface. The file-system interface may be configured to enable multihop communication between a first network and at least one additional network. The file system interface may be further configured to transmit a file from a first node associated with the first network to a second node. The file-system interface may be further configured to transmit the file from the second node to a third node associated with the at least one additional network.

The embodiments described herein may provide numerous advantages over the prior art. For example, some embodiments may be used to provide a natural interface for configuring and using a delay-tolerant transport. The interface may be easily integrated with existing software, since a component need only know how to write a file to use the interface. The topology of the delay-tolerant overlay may be easily updated dynamically by a person or a software component.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A method for delay tolerant networking comprises the following computer-implemented operations:
   transmitting a file from a first node associated with a first network to at least one intermediate node via a file-system interface;
   receiving the file at the at least one intermediate node via the file system interface;
   transmitting the file from the at least one intermediate node to at least one node of an additional network via the file-system interface; and
   receiving the file at the at least one node of the additional network via the file-system interface;
   controlling the transmission of the file using a directory structure associated with the file-system interface, the directory structure configured to enable multi-hop communication between a plurality of nodes;
   placing the file within an incoming subdirectory of the directory structure; and
   creating at least one lock file associated with the file;
   wherein the at least one lock file is deleted upon successful transmission of the file to the at least one intermediate node and/or the at least one node of the additional network; and
   wherein the file-system interface enables a user to describe the topology of the delay tolerant network, and further dynamically change the topology with a set of transport layer operators.

2. The method according to claim 1, wherein transmitting and receiving of the file is performed via a store-and-forward service.

3. The method according to claim 1, wherein the first node, the at least one intermediate node and the at least one node of the additional network include the file-system interface.

4. The method according to claim 3, wherein each node comprises a connectivity tester configured to determine the accessibility of an adjacent node.

5. The method according to claim 4, wherein each node includes a file transport and at least one network stack configured to allow communication between at least the first node, the at least one intermediate node and the at least one node of the additional network.

6. The method according to claim 1, further comprising placing the file in a first file system associated with the first network.

7. The method according to claim 1, further comprising placing the file in a second file system associated with the at least one additional network.

8. A system comprising:
- a file-system interface configured to enable multihop communication between a first network and at least one additional network, the file system interface further configured to transmit a file from a first node associated with the first network to a second node, the file-system interface further configured to transmit the file from the second node to a third node associated with the at least one additional network;
- wherein the file-system interface includes a directory structure configured to control the transmission of the file and at least one lock file associated with the file is created;
- wherein the at least one lock file is deleted upon successful transmission of the file to the second node and/or the third node; and
- wherein the file-system interface enables a user to describe the topology of the delay tolerant network, and further dynamically change the topology with a set of transport layer operators.

9. The system according to claim 8, wherein each node comprises a delay tolerant service comprising a plurality of operation modules configured to control the operation of the delay-tolerant service.

10. The system according to claim 9, wherein the plurality of operation modules include a push operation configured to establish connectivity with a target device and copy at least one file from a local device to an incoming directory corresponding to the local device on the target device.

11. The system according to claim 10, wherein the plurality of operation modules include a migrate operation configured to copy at least one file from an incoming subdirectory to at least one outgoing subdirectory.

* * * * *